(12) United States Patent
Rickeshenrich et al.

(10) Patent No.: US 9,816,484 B2
(45) Date of Patent: Nov. 14, 2017

(54) SAFETY SYSTEM FOR A WIND TURBINE (71) Applicant: SSB WIND SYSTEMS GMBH & CO. KG, Salzbergen (DE)

(72) Inventors: Christof Rickeshenrich, Ochtrup (DE); Jan De Veen, Steinfurt (DE); Dirk Klein, Hagen a.T.W. (DE); Ronald Horstjan, Schüttorf (DE)

(73) Assignee: SSB Wind Systems GmbH & Co. KG, Salzbergen (DE)

( * ) Notice: Subject to any disclaimer, the term of this patent is extended or adjusted under 35 U.S.C. 154(b) by 221 days.

(21) Appl. No.: 14/402,476

(22) PCT Filed: Jun. 3, 2013

(86) PCT No.: PCT/EP2013/061366
§ 371 (c)(1),
(2) Date: Dec. 18, 2014

(87) PCT Pub. No.: WO2013/182514
PCT Pub. Date: Dec. 12, 2013

(65) Prior Publication Data
US 2015/0233351 A1 Aug. 20, 2015

(30) Foreign Application Priority Data
Jun. 6, 2012 (DE) ........................ 10 2012 011 242

(51) Int. Cl.
F03D 7/02 (2006.01)
F03D 11/00 (2006.01)
F03D 7/04 (2006.01)
(52) U.S. Cl.
CPC ......... F03D 7/0224 (2013.01); F03D 7/0264 (2013.01); F03D 7/047 (2013.01); F03D 11/0091 (2013.01)

(58) Field of Classification Search
CPC ...... F03D 7/0224; F03D 7/0264; F03D 7/047; F03D 11/0091
See application file for complete search history.

(56) References Cited

U.S. PATENT DOCUMENTS 8,487,460 B2 * 7/2013 Krueger ................ F03D 7/0224
290/44
2009/0302608 A1 * 12/2009 Andresen .............. F03D 7/0224
290/44

(Continued)

FOREIGN PATENT DOCUMENTS

CN 101624969 A 1/2010
CN 102278278 A 12/2011

(Continued)

*Primary Examiner* — Aaron R Eastman
(74) *Attorney, Agent, or Firm* — Harness, Dickey & Pierce, P.L.C.

(57) ABSTRACT

The invention relates to a safety system for a wind turbine, comprising a pitch system (23), which comprises a plurality of drive systems (15, 16, 17) and at least one safety switching device (24), by means of which each of the drive systems (15, 16, 17) can be controlled to carry out a travel to a safe position in accordance with at least one control signal, a safety circuit, which is provided in a machine part adjacent to the pitch system (23) and which comprises a transmission device (32) and a controller (29), by means of which the at least one control signal can be generated, which can be transmitted from the controller (29) to the safety switching device (24) by means of the transmission device (32), wherein the control signal can be generated and/or output by the controller (29) in the form of at least two control signals (EFC 1, EFC 2), the control signals (EFC 1, EFC 2) can be transmitted from the controller (29) to the safety switching device (24) by means of the transmission device (32), a safety-relevant error can be detected in the safety circuit by means of the safety switching device (29)

(Continued)

by evaluating the control signals (EFC 1, EFC 2), and each of the drive systems (15, 16, 17) can be controlled to travel to a safe position if such an error is present.

16 Claims, 5 Drawing Sheets

(56) References Cited

U.S. PATENT DOCUMENTS

2010/0124498 A1\* 5/2010 Kabatzke ................ F03D 7/047
 416/61
2012/0086577 A1\* 4/2012 Stevens ................ F01D 21/003
 340/635

FOREIGN PATENT DOCUMENTS

| EP | 1910670 | B1 | 12/2011 |
| EP | 2418380 | A1 | 2/2012 |
| JP | 2007239599 | A | 9/2007 |

\* cited by examiner

SAFETY SYSTEM FOR A WIND TURBINE

FIELD

The invention relates to a safety system for a wind turbine, and more particularly to a safety system which comprises a pitch system for use with a wind turbine. The pitch system comprises a plurality of drive systems and at least one safety switching device, by means of which each of the drive systems can be controlled to carry out a travel to a safe position in accordance with at least one control signal, and a safety circuit which is provided in a machine part adjacent to the pitch system, and which comprises a transmission device and a controller, by means of which the at least one control signal can be generated, which can be transmitted from the controller to the safety switching device.

BACKGROUND

From EP 1 910 670 BI a wind power plant is known comprising a generator for generating electrical energy, a rotor driving the generator with pitch-adjustable rotor blades and a central control device, wherein individual pitch devices are provided for the rotor blades, comprising an adjusting drive unit, a communication link to the central control device and a regulator, wherein the rotor blades can be brought into a stop position in order to shut down the wind power plant. The individual pitch devices each also comprise a fault detector and their own triggering mechanism, wherein the fault detector is configured to recognise abnormal operating states and is connected to the triggering mechanism, which causes the respective rotor blade to be moved into an off position.

Figure 6:
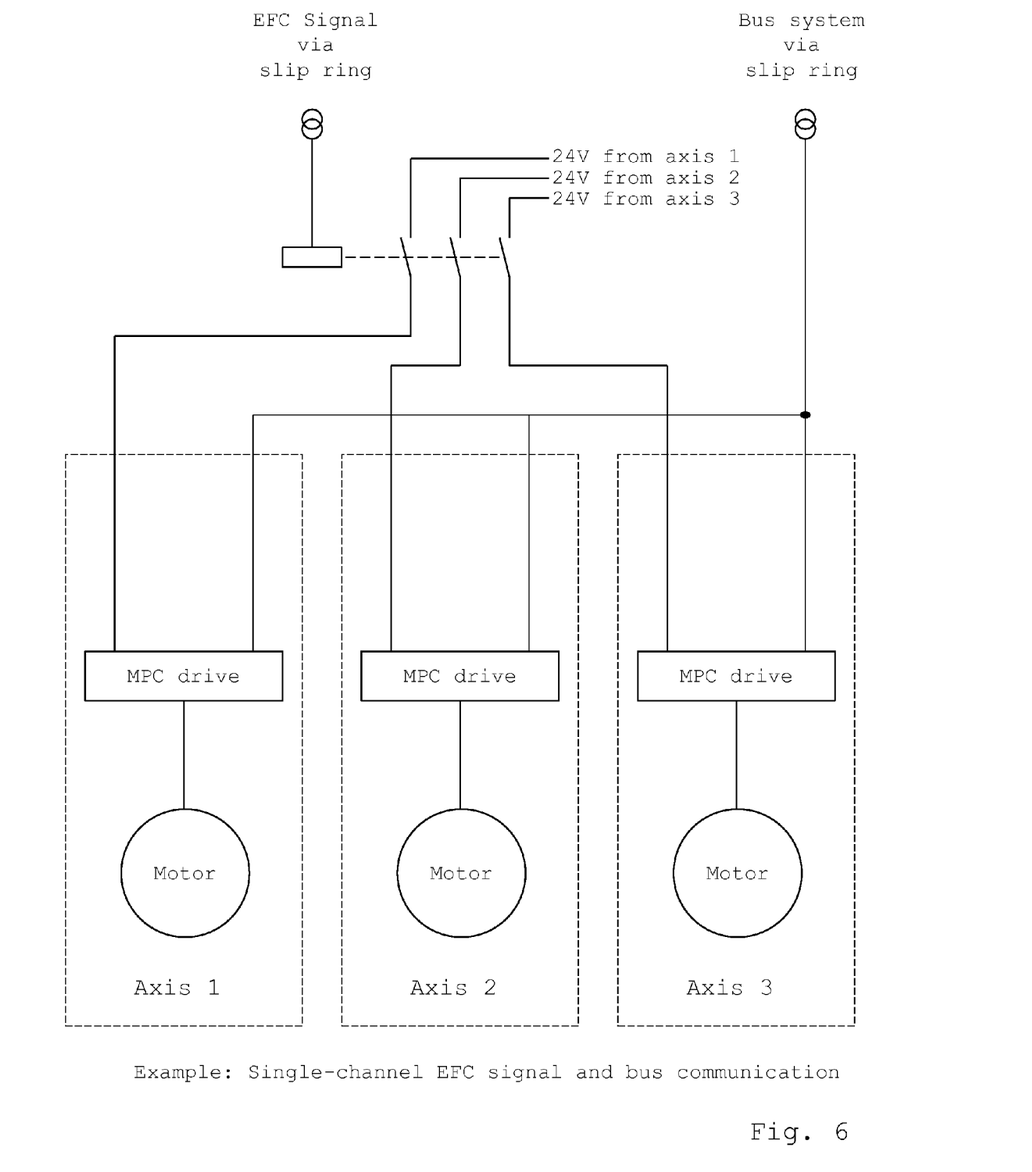
FIG. 6: a schematic representation of a known safety system.

A conventional safety system is shown in FIG. 6, wherein an EFC signal, which is triggered by a higher-order controller and/or directly by various emergency stop/sensor devices, is carried from a controller (e.g. topbox) on a single channel via a transmission device (e.g. slip ring) to a pitch system. The EFC signal is as a rule a 24V DC signal, wherein the expression EFC is an abbreviation of the term "Emergency Feather Command". In the pitch system, this signal is distributed across the three drive systems. If this EFC signal is triggered, e.g. due to a signal state change, for all three drive systems a travel to the safe position (end position) is initiated. The EFC signal thus represents a control command to the safety switching device, to rotate the rotor blades to the safe position or end position.

If an error occurs in this EFC safety chain, e.g. due to induction of interference voltage, the initiation of a travel to the safe position via this EFC signal is no longer possible. At the same time however, the control system (turbine control) also recognises the faults and initiates corresponding measures via the communication system (bus system). Thus, the turbine control and the bus system are a component part of a SRP/CS and must comply with the requirements of the Machinery Directive. The expression SRP/CS used here is an abbreviation of Safety-Related Parts of Control System.

The above procedure in the event of a fault is associated with drawbacks, however, of which some are indicated below:

the bus system and control system (turbine control) are a component part of a SRP/CS and must be considered in the light of the Machinery Directive;

there is no longer any distinction between control system and safety system;

errors in the transmission device (e.g. slip ring) can cause faults in the bus system and/or in the EFC signal.

SUMMARY

On this basis, an object of the invention is to be able to avoid the abovementioned drawbacks.

This object is achieved according to the invention by a safety system according to claim 1. Preferred features and/or embodiments of the invention are indicated in the subclaims and the following description.

The safety system according to the invention for a wind turbine comprises a pitch system. The pitch system comprises a plurality of drive systems and at least one safety switching device, by means of which each of the drive systems can be controlled to carry out a travel to a safe position in accordance with at least one control signal, and a safety circuit which is provided in a machine part adjacent to the pitch system, comprising a transmission device and a controller, by means of which the at least one control signal can be generated, which can be transmitted from the controller to the safety switching device by means of the transmission device, wherein the control signal can be generated and/or output by the controller in the form of at least two control signals. The control signals can be transmitted from the controller to the safety switching device by means of the transmission device. A safety-relevant error can be detected in the safety circuit by means of the safety switching device, in particular by evaluating the control signals, for example in its transmission device. And where such an error is present, each of the drive systems can be controlled to carry out a travel to a safe position.

Because a safety-relevant error in the safety circuit can be detected by means of the safety switching device and furthermore because each of the drive systems can be controlled to carry out an emergency departure by means of the safety switching device, the detection of the safety-relevant error and the control of the drive systems to perform a travel to a safe position if such an error is present takes place within the pitch system. A detour via the control system of the wind turbine is thus no longer necessary, allowing the drawbacks known from the state of the art to be avoided. The safety system forms or comprises in particular a safety chain and/or the safety system forms or comprises in particular a safety arrangement. The safety circuit and the safety switching device preferably form the safety chain and/or the safety chain comprises the safety circuit and the safety switching device. Since the pitch system comprises the safety switching device, the safety chain can, for example, also comprise the safety circuit and the pitch system. The safety circuit in particular forms a safety circuit device. The controller further forms in particular a controller device.

The detection of a safety-relevant error in the safety circuit by means of the safety switching device is possible in particular due to the at least two control signals. According to one configuration, the control signals can undergo a plausibility check by means of the safety switching device, wherein the presence of a safety-relevant error in the safety circuit can be detected from the result of the plausibility check.

According to one development during the plausibility check, in addition to the control signals, at least one other signal is included, which in particular by means of the transmission device can be transmitted to the safety switching device. Preferably by means of the safety switching device the control signals can therefore undergo together with at least one other signal, which by means of the transmission device can be transmitted to the safety switching device, the plausibility check.

In this way, the reliability of the plausibility check can be further increased.

The safety switching device preferably comprises a short-circuit detection and/or a cross-circuit detection. The presence of a short-circuit or a cross-circuit can preferably be detected as a safety-relevant error in the safety circuit from the result of the plausibility check. Through the use of at least one safety switching device within the pitch system, which has a short- and cross-circuit detection, in particular the reliable transmission of the control signals from the controller, via the transmission device, as far as the pitch system can be guaranteed.

Preferably, the control signal can be generated and/or output redundantly by the controller in the form of at least two control signals. The control signals thus preferably involve identical and/or redundant signals. If the control signals differ from one another, then it is highly likely that there is a safety-relevant error in the safety circuit.

The control signals can preferably be compared with one another by means of the safety switching device. In particular the presence of a safety-relevant error in the safety circuit can be detected from the result of this comparison by means of the safety switching device. The plausibility check therefore preferably comprises a comparison of the control signals with one another.

It is advantageous if at least one of the control signals or the control signals can be compared by means of the safety switching device with the at least one other signal. In particular, the presence of a safety-relevant error in the safety circuit can be detected from the result of this comparison by means of the safety switching device. The plausibility check thus preferably comprises a comparison of the control signals, or at least one of the control signal(s), with the at least one other signal.

Preferably, by means of the safety switching device the presence of a safety-relevant error in the safety circuit can be detected in that the control signals are different. Advantageously by means of the safety switching device the presence of a safety-relevant error in the safety circuit can be detected in that the control signals differ from one another beyond a specified time span and/or beyond a permitted deviation. In this way, short-time and/or insignificant signal fluctuations in the control signals can be ignored. The specified time span is for example a few milliseconds. The specified deviation is in particular given by a lower threshold value and an upper threshold value, wherein between the threshold values the difference in the control signals may vary, without a safety-relevant error being present. If the difference in the control signals reaches or falls below the lower threshold value, or if the difference in the control signals reaches or exceeds the upper threshold value, the safety switching device detects a safety-relevant error.

According to a development the control signals can be generated such that the control signals, during operation as intended of the wind turbine, have a specified voltage, preferably different from zero, and/or that a voltage-free state of the control signals represents a command for a travel to the safe position. The drive systems are preferably controlled by means of the safety switching device to perform a travel to the safe position if the control signals take a voltage-free state. In this case both control signals may even fail as a travel to the safe position is performed independently of whether the control signals are voltage-free intentionally or as a result of an error in the safety circuit. It should be noted here that the failure of both control signals in particular represents a safety-relevant error in the safety circuit.

The at least one control signal is in particular an EFC signal. The control signals are preferably EFC signals. Advantageously the control signals can be generated such that the control signals during operation as intended of the wind turbine have a specified first signal level preferably different from zero. In particular, the first signal level is a direct voltage, preferably a direct voltage different from zero, for example a direct voltage of 24V. The first signal level preferably represents a level H.

Advantageously, the control signals can also be generated, in that the control signals for signalling a travel to the safe position have a specified second signal level, which differs from the first signal level. The second signal level represents in particular a level L and is preferably lower than the first signal level. Preferably, the second signal level is equal to zero and/or is at zero potential. In particular the control signals can be switched off by means of the controller for performing a travel to the safe position.

If the signal levels of the control signals differ from one another, then it is highly likely that there is a safety-relevant error in the safety circuit. The signal levels of the control signals can therefore preferably be compared with one another by means of the safety switching device. In particular, the presence of a safety-relevant error in the safety circuit can be detected from the result of this comparison by means of the safety switching device. The plausibility check therefore preferably comprises a comparison of the signal level of the control signals with one another.

Preferably, by means of the safety switching device the presence of a safety-relevant error in the safety circuit can be detected in that the control signals have different signal levels. Advantageously, by means of the safety switching device the presence of a safety-relevant error in the safety circuit can be detected in that the signal levels differ from one another beyond a specified time span and/or beyond a permitted deviation. In this way short-time and/or insignificant fluctuations in the signal levels can be ignored. The specified time span is for example a few milliseconds. The specified deviation is in particular given by a lower threshold value and an upper threshold value, wherein between the threshold values the difference in the signal levels may vary, without a safety-relevant error being present. If the difference in the signal levels reaches or falls below the lower threshold value, or if the difference in the signal levels reaches or exceeds the upper threshold value, the safety switching device detects a safety-relevant error.

The transmission device preferably comprises a plurality of electrical lines. The control signals are in particular in each case transmitted via one of the electrical lines, wherein the lines transmitting the control signals are also referred to as control lines. Advantageously, the other signal is also transmitted via one of the electrical lines. The electrical lines and/or the control lines are in particular electrically separated lines.

The transmission device preferably comprises slip rings or at least one slip ring, via which the at least one control signal and/or the control signals can pass. Advantageously the transmission device also comprises at least one slip ring or at least one other slip ring, via which at least one other signal can pass. The transmission device is in particular a rotary transmission device. The electrical lines and/or control lines are preferably run via the slip rings of the transmission device. Advantageously, the electrical lines and/or control lines of the transmission device are run via separate slip rings of the transmission device. The slip rings transmitting the control signals are for example also referred to as control signal slip rings.

By means of the safety switching device in particular a short-circuit in one or in at least one of the control lines can be detected. In the event of a short-circuit, the control line concerned in particular is voltage-free and/or is at zero potential and/or at L level. Preferably by means of the safety switching device, a cross-circuit between one or at least one of the control lines and one or at least one other of the electrical lines can be detected, which for example may be the line carrying the other signal. In the event of a cross-circuit the control line concerned takes implausible voltage values, which can advantageously be detected by means of the safety switching device.

The drive systems preferably comprise in each case a motor control and a motor, which in particular is an electric motor. The motor controls comprise in particular in each case an inverter, a DC-DC converter and/or other rectifiers. The number of drive systems is preferably three.

The safety switching device preferably comprises at least one control unit. In particular by means of the control unit the plausibility check and/or the or each comparison and/or the short-circuit detection and/or the cross-circuit detection can be carried out. The control unit forms or comprises for example a microprocessor, a microcontroller, an application specific integrated circuit (ASIC), a Field Programmable Gate Array (FPGA) and/or another programmable circuit of the signal processing.

The safety switching device preferably comprises at least one switching device, by means of which each of the drive systems and/or of the motor controls can be supplied with an activation signal. In particular the switching device can be controlled by the control unit. The activation signal can be a common activation signal for all drive systems. Preferably each of the drive systems and/or each of the motor controls by means of the at least one switching device can be supplied with a separate activation signal, however. The activation signals are in particular direct voltage signals. Each activation signal is or delivers preferably a direct voltage of for example 24V. Advantageously the pitch system supplies the activation signals. Preferably each of the activation signals is assigned to one of the drive systems. By way of example each of the activation signals is delivered by the respective drive system and/or the respective motor control, so that each of the activation signals by means of the safety switching device and/or the switching device can be attributed to the respective drive system and/or the respective motor control. If the activation signals are supplied to the drive systems and/or the motor controls, then by means of the drive systems and/or the motor controls a travel to the safe position is carried out. By means of the activation signals it can thus be signalled to the drive systems and/or the motor controls to carry out a travel to the safe position. The switching device preferably comprises one or at least one relay or is formed by one or at least one relay. In particular, the safety switching device can thus also be referred to as a safety relay. Preferably the safety system comprises, for example for expansion purposes, a plurality of safety relays (safety switching devices), which in particular can be coupled to one another. Advantageously the pitch system comprises this safety relay. Preferably each of the safety relays can be designed and/or developed according to all configurations described in connection with the safety switching device.

According to a configuration by means of the safety switching device at least two signals can be generated, which by means of the transmission device can be transmitted from the safety switching device to the controller. These signals will in the following also be referred to as test signals. By means of the controller from the test signals in particular the control signals can be formed. Advantageously, by means of the controller at least two switches can be switched, on the input side of which in each case one of the test signals is applied, wherein the control signals are formed by the output signals from the switches. Preferably in this way, in particular in the closed state of the switches, two signal loops are created, so that the error detection reliability is further increased. The switches can in particular be assigned to the controller.

The test signals are in particular in each case transmitted via one of the electrical lines of the transmission device, wherein the lines carrying the test signals are also referred to as test signal lines. Preferably the transmission device comprises slip rings, via which the test signals can be carried and/or the test signal lines are run. These slip rings are for example also referred to as test signal slip rings.

Advantageously, the test signals can be generated such that they have a specified voltage, preferably different from zero. In particular the test signals have a direct voltage, preferably a direct voltage different from zero, for example a direct voltage of 24V. Advantageously the test signals have a level H. The test signals are preferably identical and/or redundant signals.

Preferably, the switches are closed during operation as intended of the wind turbine. Thus, the test signals are in particular looped back to the safety switching device. Advantageously the switches can be opened by means of the controller for carrying out a travel to travel to the safe position. It is similarly possible for the switches to be reversing switches, by means of which the control lines upon opening of the switches are placed at zero potential and/or the level L. By opening the switches the control signals thus become voltage-free and/or have a level L and/or zero potential. In the closed state of the switches the control signals correspond in particular to the test signals. In the open state of the switches there is preferably no voltage on the control lines, so that the control signals are not present and/or in each case deliver no voltage, corresponding to a level L and/or zero potential.

According to an advantageous configuration of the invention the safety switching device or devices sends or send at least two signals via the slip rings to the controller. In the controller these signals are switched via a corresponding SRP/CS and directed again via the transmission device to the pitch system. If in the safety circuit of the adjacent machine part (e.g. in the transmission device) there is a safety-relevant error (e.g. cable breakage, cross-circuit, short-circuit, channel hop and thus interference voltage and so on), this is detected by the safety switching device or devices in the pitch system. The safety switching device or devices immediately and independently of the system control "reliably" initiates or initiate, for all three drive systems, the "travel to the safe position". Each of the three drive systems is controlled via a separate relay output of the safety switching device.

The controller comprises or forms preferably a logic unit. According to a configuration at least one input signal can be supplied to the controller, which can be evaluated by the latter, wherein the at least one control signal and/or the control signals can be generated as a function of the at least one input signal. By means of the controller therefore, by evaluating the at least one input signal it can be determined if the control signal of the safety switching device is to signal the command for the drive systems to carry out a travel to the safe position.

According to a development the least one input signal can be generated by means of a higher-order controller. If the higher-order controller detects an error, making it necessary to shut down the wind turbine, a command can thus be signalled to the safety switching device to control the drive systems to perform a travel to the safe position. The higher-order controller is for example also referred to as a wind turbine controller or turbine controller. Additionally or alternatively, a sensor device comprising at least one sensor connected to the controller is provided for, by means of which the input signal can be generated as a function of at least one sensor signal.

By means of the at least one sensor, preferably at least one operating parameter of the wind turbine can be detected. The sensor signal and/or the input signal is/are therefore preferably a function of the at least one operating parameter. If the evaluation of the input signal shows that the at least one operating parameter is inadmissible, by means of the controller via the control signals the command can be signalled to the safety switching device to control the drive systems to carry out a travel to the safe position.

The wind turbine preferably comprises a rotor. In particular the rotor is rotatable relative to the machine part, preferably about a rotor axis. Advantageously, the rotor is supported on the machine part so that it can rotate, preferably about the rotor axis. The rotor preferably has a rotor hub and a plurality of rotor blades, which are in particular each supported on the rotor so that they can rotate about a blade axis. The number of rotor blades is preferably three.

In particular the blade axes of the rotor blades run perpendicularly or approximately perpendicularly to the rotor axis.

The machine part comprises in particular devices and/or machines of the wind turbine. For example, the machine part comprises an electric generator, which can be driven by the rotor. The machine part can also comprise the higher-order controller. The wind turbine preferably comprises a tower, at the top end of which the machine part is provided.

The rotor comprises in particular the pitch system. Advantageously the pitch system is arranged in the rotor. Each of the rotor blades is preferably assigned one of the drive systems. In particular, each rotor blade can be rotated about its blade axis by means of the drive system assigned to it.

Each rotor blade is preferably mechanically coupled to one or more of the drive systems, and in particular with the drive system assigned to it. If each rotor blade is mechanically coupled to more than one of the drive systems, then these preferably form a master/slave arrangement. Advantageously, each rotor blade is mechanically coupled to one of the motors, and in particular to the motor of the drive system assigned to it. During a travel to the safe position in particular, the rotor blades, by means of the drive systems, are rotated to a safe position, which is also referred to as the "feathering" position. Preferably during a travel to the safe position the rotor blades, preferably via the shortest path, are conveyed to the safe position, which advantageously corresponds to a 90° position of the rotor blades, in particular with regard to the rotor plane. Preferably therefore during a travel to the safe position the blade angles (pitch angles) of the rotor blades, in particular with regard to the rotor plane, are set at an angle of in particular 90° and/or changed from a starting angle of, for example, 0° or for example between 0° and approximately 30°, to an end angle of preferably 90°.

Preferably, the pitch system, in particular together with the rotor comprising the pitch system, can be rotated relative to the adjacent machine part, preferably about the rotor axis. Preferably the at least one sensor is a speed sensor, by means of which in particular the speed of the pitch system and/or the speed of the rotor comprising the pitch system relative to the machine part can be detected. If the outcome of the evaluation of the at least one input signal by means of the controller is that this speed has reached or fallen below a specified speed threshold, the safety switching device by means of the controller can in particular be signalled with the command to control the drive systems to carry out a travel to the safe position. Preferably, the sensor is provided in a redundant manner so that the at least one input signal can be supplied to the controller in the form of at least two, in particular redundant, input signals. In this way, the shutting down of the wind turbine in the event of excessive speed can be ensured even in the event of failure of one of the sensors.

The safety system is preferably a component part of a SRP/CS. In particular the safety system is designed according to a machinery directive for the wind turbine.

The wind turbine comprises in particular the safety system. The safety system according to the invention is therefore preferably a safety system of or in a wind turbine.

The invention further relates to a wind turbine with a machine part, and a rotor supported on the machine part so that it can rotate. The rotor comprises a rotor hub and a plurality of rotor blades which are each supported on the rotor hub so that they can rotate about a blade axis, and at least one safety system. The safety system is in particular a safety system according to the invention, which can be developed according to all configurations explained in the present disclosure.

The invention also relates to the application of a safety system for use with a wind turbine, wherein the safety system comprises a pitch system. The pitch system comprises a plurality of drive systems and at least one safety switching device, by means of which each of the drive systems can be controlled to carry out a travel to a safe position in accordance with at least one control signal. A safety circuit is provided in a machine part adjacent to the pitch system, and comprises a transmission device and a controller, by means of which the at least one control signal is generated, which by means of the transmission device of the controller is transmitted to the safety switching device, wherein the control signal is generated or output by the controller in the form of at least two control signals, by means of the transmission device the control signals are transmitted from the controller to the safety switching device, and by means of the safety switching device, in particular through evaluation of the control signals, a safety-relevant error in the safety circuit, for example in its transmission device, can be detected and where such an error is present each of the drive systems by means of the safety switching device can be controlled to carry out a travel to the safe position. The application according to the invention can be developed according to all configurations explained in connection with the safety system according to the invention. Preferably the control signal is generated and/or output redundantly by the controller in the form of the at least two control signals.

The invention also relates to a method for controlling a wind turbine with a safety system. The method comprises using a pitch system, comprising a plurality of drive systems and at least one safety switching device, and wherein each of the drive systems can be controlled to carry out a travel to a safe position in accordance with at least one control signal. A safety circuit is used in a machine part adjacent to the pitch system, and comprise a transmission device and a controller, by means of which the at least one control signal is generated, which by means of the transmission device of the controller is transmitted to the safety switching device, wherein the control signal is generated and/or output by the controller in the form of at least two control signals, by means of the transmission device the control signals are transmitted from the controller to the safety switching device, and by means of the safety switching device, in particular through evaluation of the control signals, a safety-relevant error in the safety circuit, for example in its transmission device, can be detected and where such an error is present each of the drive systems by means of the safety switching device can be controlled to carry out a travel to the safe position. The method according to the invention can be developed according to all configurations explained in connection with the safety system according to the invention. In particular the method according to the invention is carried out with the safety system according to the invention. Preferably the control signal is generated and/or output redundantly by the controller in the form of the at least two control signals.

The invention offers in particular the advantages indicated below:

Clear separation of the control system and safety system.

The control system detects faults and initiates appropriate measures thereby placing the machine back within normal operating range.

The safety system automatically responds once the safety-relevant limiting values have been exceeded.

Only the safety system is then a component of a SRP/CS and must conform to the Machinery Directive.

Performance level is stipulated by the machinery manufacturers, thus compliance with standard "EN ISO 13849-1/2".

Creation of a reliable SRP/CS link between pitch system and adjacent machine part (e.g. slip ring, topbox).

Only the safety system is a component of the "safety-related parts of a control system" (SRP/CS). The control system is in particular subordinate to the safety system. Thus the safety system is independent of the control systems software and automatically initiates measures once the safety-relevant limiting values have been exceeded.

BRIEF DESCRIPTION OF DRAWINGS

The invention is described in the following using preferred embodiments and with reference to the drawing. The drawing shows as follows.

DETAILED DESCRIPTION

Figure 1:
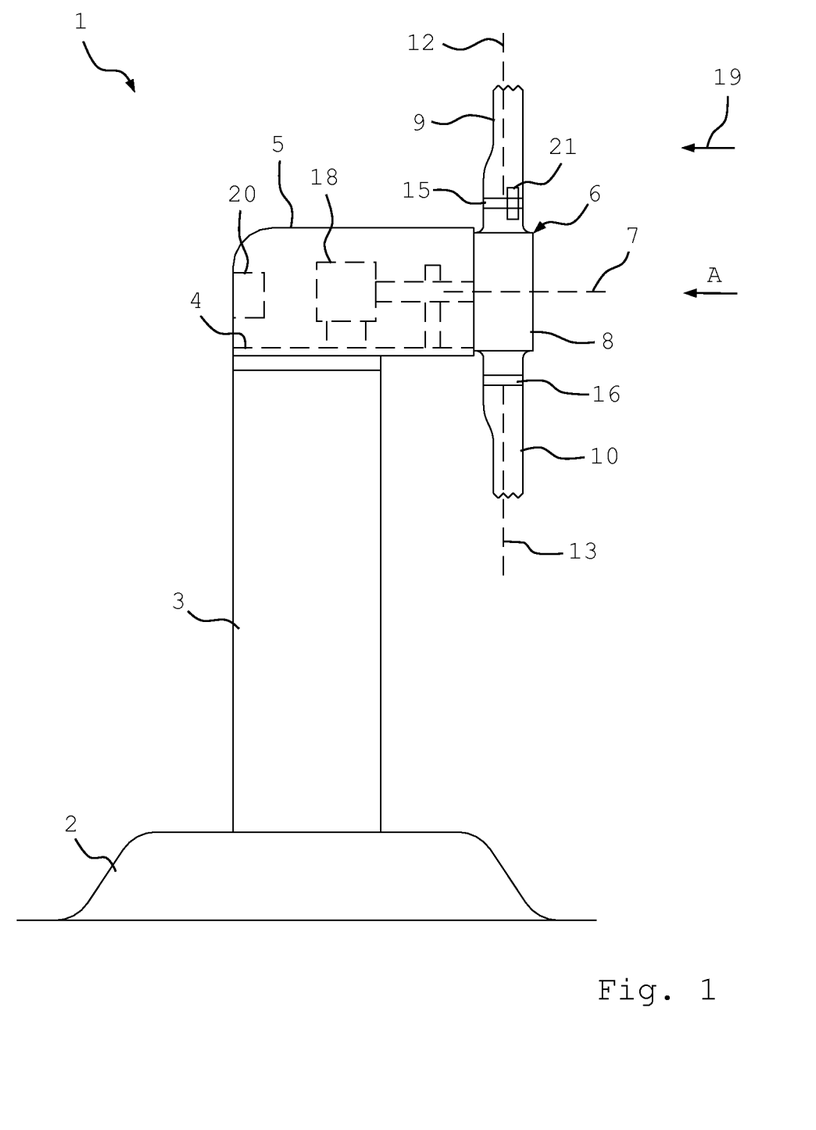
FIG. 1: a schematic view of a wind turbine.
Figure 2:
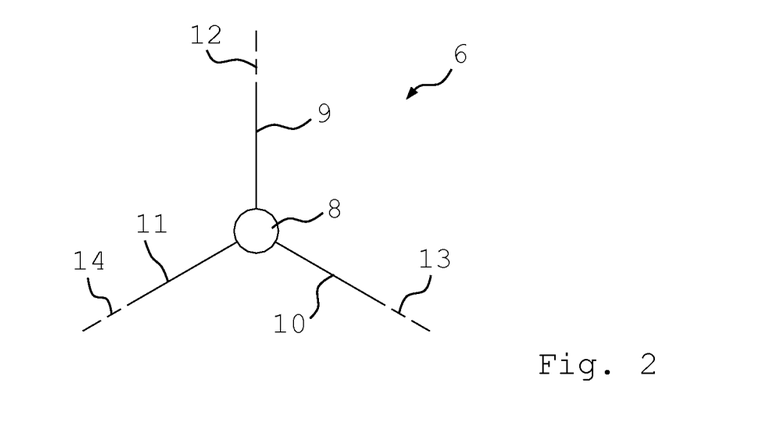
FIG. 2: a schematic front view of a rotor of the wind turbine.
Figure 3:
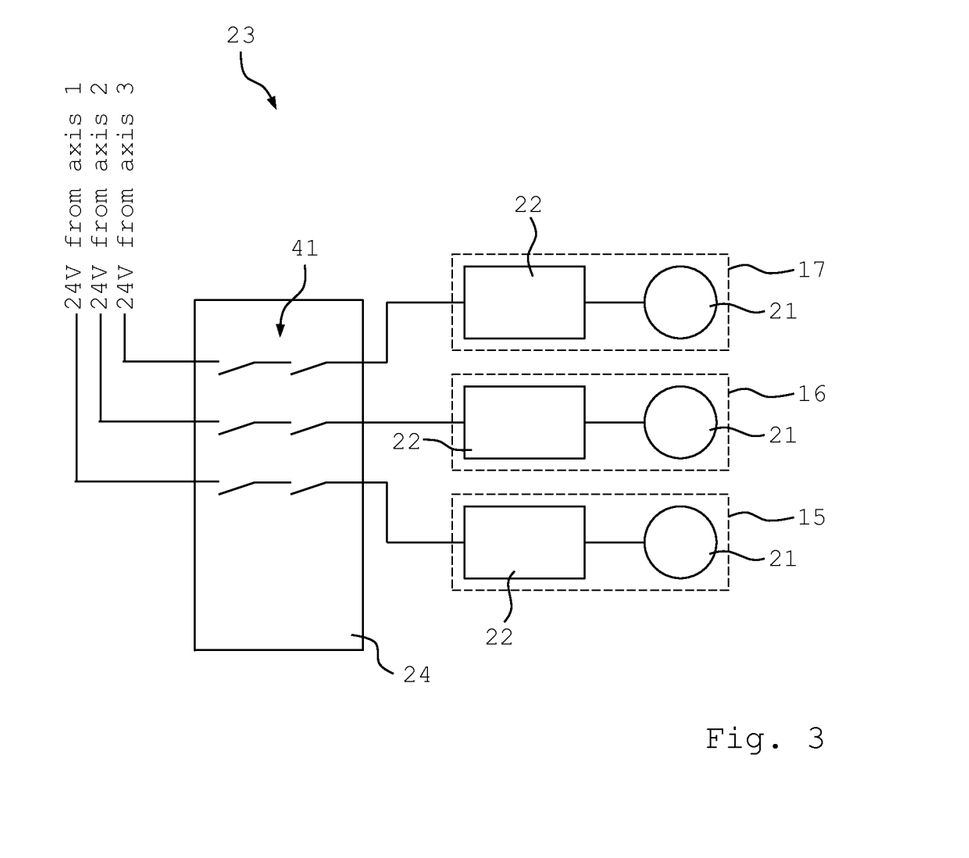
FIG. 3: a schematic representation of a pitch system of the wind turbine.

FIG. 1 shows a wind turbine 1 with a tower 3 standing on a foundation 2, on the upper end of which opposite to the foundation 2 a machine base 4 is supported, supporting a nacelle 5. On the machine base 4 a rotor 6 is supported that can rotate about a rotor axis 7. A schematic front view of the rotor 6 is shown in FIG. 2. The rotor 6 has a rotor hub 8 and rotor blades 9, 10 and 11 connected to it, which are rotatable respectively about their blade axis 12, 13 and 14 relative to the rotor hub 8. Here, the blade axes 12, 13 and 14 run perpendicularly or approximately perpendicularly to the rotor axis 7. Each of the rotor blades 9, 10 and 11 is mechanically coupled to a drive system 15, 16 or 17 (see FIG. 3), by means of which the respective rotor blade is rotatable about the associated blade axis.

The rotor 6 is mechanically coupled to an electric generator 18. The electric generator 18 is secured to the machine base 4 and arranged in the nacelle 5. The rotor 6 is rotated by wind 19 about its rotor axis 7. The rotational energy of the rotor 6, by means of the generator 18, is at least partly converted into electrical energy. For the controlled operation of the wind turbine 1 a higher-order controller 20 is provided, by means of which inter alia the drive systems 15, 16 and 17 are controlled. Each of the drive systems 15, 16 and 17 has a motor 21 and an associated motor control 22. The motor 21 of the drive system 15 is shown schematically in FIG. 1. The drive systems 15, 16 and 17 are part of a pitch system 23 arranged in the rotor 6, as shown in a simplified (partial) representation in FIG. 3. When the wind turbine 1 is operated as intended, the pitch system 23 is controlled by the higher-order controller 20 to rotate the rotor blades 9, 10 and 11 into desired blade angle positions. Furthermore, in FIG. 3 a safety switching device 24 with a relay 41 is shown, by means of which each motor control 22 can be supplied via a separate relay output with an activation signal, which here is 24V. The activation signals are referred to as "24V from axis 1", "24V from axis 2" and "24V from axis 3". If the activation signals are supplied to the motor controls 22, then the drive systems 15, 16 and 17 carry out a travel of the rotor blades 9, 10 and 11 to the safe position. The drive system 15 is also referred to as "Axis 1", drive system 16 as "Axis 2" and drive system 17 as "Axis 3". The activation signals originate from the drive systems 15, 16 and 17. The activation signal "24V from axis 1" originates from drive system 15, the activation signal "24V from axis 2" originates from drive system 16 and the activation signal "24V from axis 3" originates from drive system 17.

Figure 4:
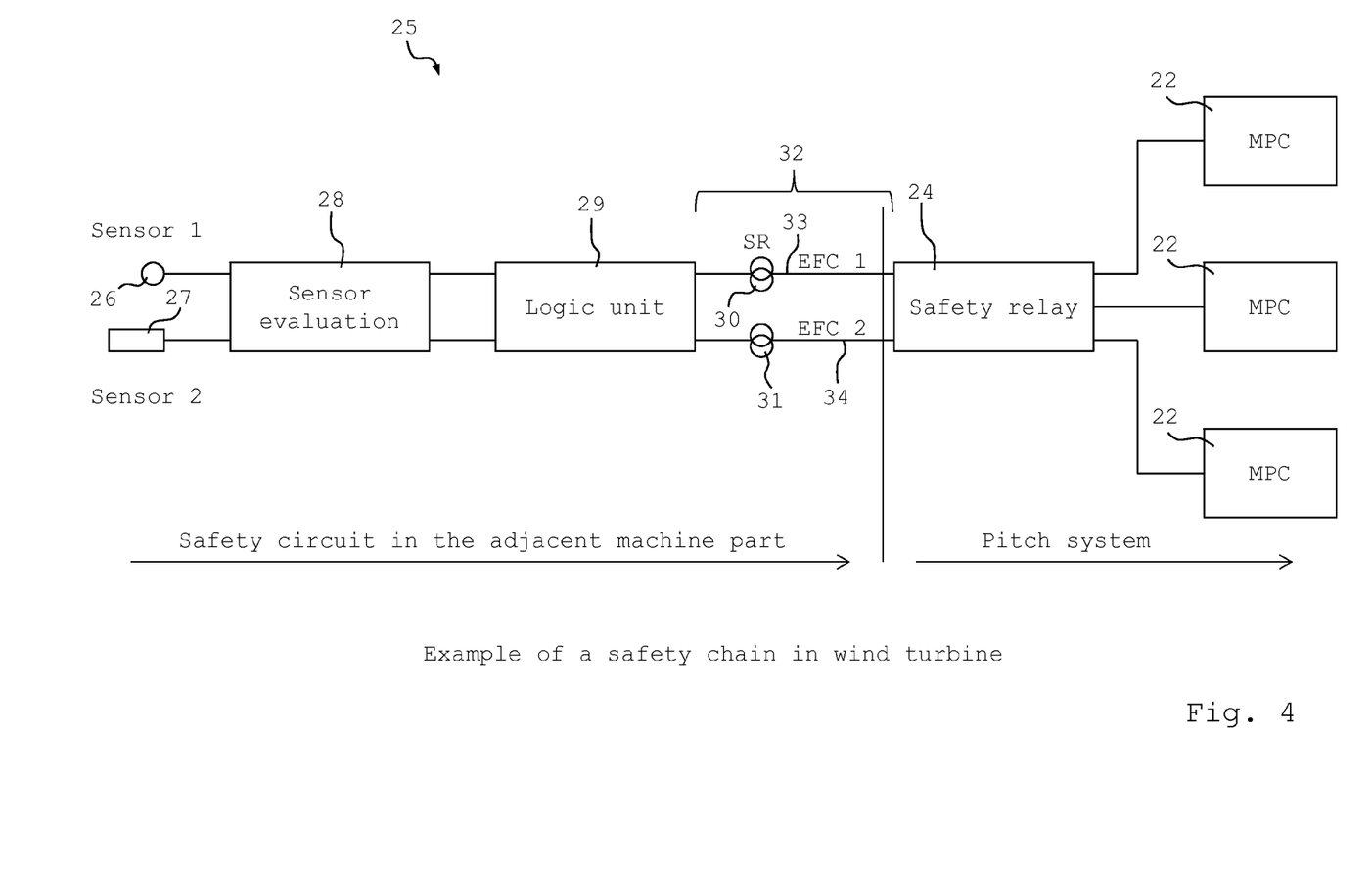
FIG. 4: a schematic representation of a safety system of the wind turbine according to a first embodiment of the invention.

FIG. 4 is a schematic representation of a safety system 25 according to a first embodiment. Two sensors (sensor 1, sensor 2) 26 and 27 are connected to an evaluation device (sensor evaluation) 28, by means of which a signal processing of the sensor signals provided by the sensors 26 and 27 takes place. Here, the sensors 26 and 27 and the evaluation device 28 together form a sensor device. The sensors 26 and 27 capture in particular one or at least one operating parameter of the wind turbine in a redundant manner. The operating parameter is, or comprises, for example the speed of the rotor 6. Accordingly, the sensors 26 and 27 are speed sensors by means of which the rotational speed of the rotor 6 about the rotor axis 7 can be captured.

The processed sensor signals are supplied to a controller (logic unit) 29, by means of which it can be detected if the operating parameter captured is within permitted limits. In particular, by means of the controller 29, a check is made if the speed captured has reached or exceeded a specified speed threshold value. The controller 29 generates two identical control signals EFC 1 and EFC 2. The signals EFC 1 and EFC 2 are passed via slip rings 30 and 31 of a transmission device (SR) 32 to the safety switching device (safety relay) 24. If the operating parameter is within the permitted limits and/or if the speed is below the speed threshold value, the control signals EFC 1 and EFC 2 in each case deliver a direct voltage of 24V, corresponding to a level H. If the operating parameter is outside the permitted limits and/or if the speed is greater than or equal to the speed threshold value, the control signals EFC 1 and EFC 2 deliver a voltage of 0V, corresponding to a level L.

The sensors 26 and 27, the evaluation device 28, the controller 29 and the transmission device 32 together form a safety circuit which is provided in the machine part of the wind turbine 1. The machine part comprises in particular the machine base 4 and/or the devices and/or machines provided on the machine base, wherein the rotor 6 with pitch system 23 is not attributed to the machine part. The safety circuit and the safety switching device 24 and/or the safety circuit and the pitch system 23 together preferably form a safety chain.

The safety switching device 24 comprises a short- and cross-circuit detection. Accordingly, by means of the safety switching device 24, short- and cross-circuits in the control lines 33 and 34 of the transmission device 32, carrying control signals EFC 1 and EFC 2, can be detected as errors in the transmission of the control signals. In addition, by means of the safety, switching device 24 other errors in the transmission of the control signals are also detectable, such as for example a cable breakage and/or a channel hop. If by means of the safety switching device 24 an error in the control signals and/or in the transmission of the control signals is captured, the safety switching device 24, by operation of its relay 41, supplies each motor control 22 with the associated activation signal so that the drive systems 15, 16 and 17 can carry out a travel to the safe position. An error in the control signals and/or in the transmission of the control is then present, for example, if the control signals, for example due to faults, differ from one another, and in particular if the control signals differ from one another by more than a specified amount.

Figure 5:
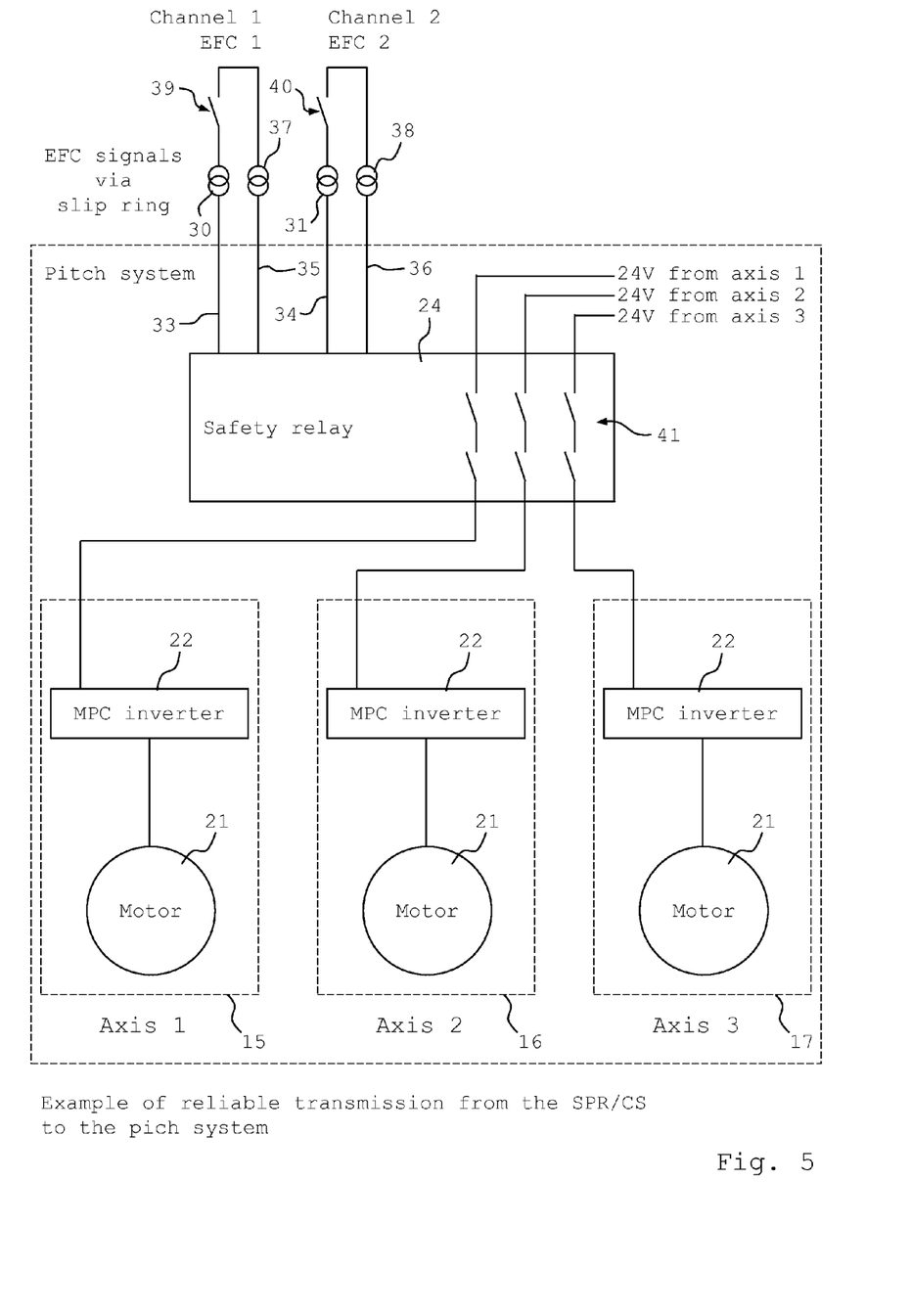
FIG. 5: a schematic representation of a safety system of the wind turbine according to a second embodiment of the invention.

FIG. 5 is a schematic representation of a safety system 25 according to a second embodiment of the invention, wherein features identical or similar to those of the first embodiment are given the same reference numbers as for the first embodiment. The safety switching device 24 generates two electric test signals. These two electric test signals are supplied via separate test signal lines 35 and 36, passed via slip rings 37 and 38 of the transmission device 32, to the inputs of electric switches 39 and 40. The two electric test signals deliver in each case a direct voltage of 24V, corresponding to a level H. The control lines 33 and 34 are connected to the outputs of the switches 39 and 40.

The switches 39 and 40 are switchable by means of the controller (logic unit), as a result of which the control signals EFC 1 and EFC 2 can be generated. In the closed state of the switches 39 and 40 the two electric test signals are looped back via the control lines 33 and 34 to the safety switching device 24. The control signals EFC 1 and EFC 2 in each case deliver a direct voltage of 24V, corresponding to a level H. In the closed state of switches 39 and 40, the control signals EFC 1 and EFC 2 thus correspond to the test signals. In the open state of the switches 39 and 40, on the other hand, there is no voltage on the control lines 33 and 34. As a result, the control signals EFC 1 and EFC 2 are not present and/or in each case deliver no voltage, corresponding to a level L.

For a further description of the second embodiment, reference is made to the description of the first embodiment. In particular, the safety system according to the second embodiment can replace the safety system according to the first embodiment.

LIST OF REFERENCE NUMBERS

1 Wind turbine
2 Foundation
3 Tower
4 Machine base
5 Nacelle
6 Rotor
7 Rotor axis
8 Rotor hub
9 Rotor blade
10 Rotor blade
11 Rotor blade
12 Blade axis
13 Blade axis
14 Blade axis
15 Drive system
16 Drive system
17 Drive system
18 Generator
19 Wind
20 Higher-order controller
21 Motor
22 Motor control
23 Pitch system
24 Safety switching device
25 Safety system
26 Sensor
27 Sensor
28 Evaluation device
29 Logic unit/controller
30 Slip ring
31 Slip ring
32 Transmission device
33 Electric control line
34 Electric control line
35 Electric test signal line
36 Electric test signal line
37 Slip ring
38 Slip ring
39 Electric switch
40 Electric switch
41 Safety switching device relay

The invention claimed is:

1. A safety system for a wind turbine, wherein the wind turbine includes a rotor having a plurality of rotor blades, the safety system comprising:
   a pitch system including:
      a plurality of drive systems operably associated with each of the rotor blades, and
      at least one safety switching device, the safety switching device configured to enable each of the drive systems to be controlled, using at least one control signal, to carry out a travel of its associated said rotor blade to a safe position;
   a safety circuit provided in a machine part adjacent to the pitch system, the safety circuit including a transmission device and a controller, the controller generating the at least one control signal which is transmitted from the controller to the safety switching device by the transmission device;
   the control signal further being output by the controller in the form of at least two control signals EFC 1 and EFC 2;
   the control signals EFC 1 and EFC 2 being transmitted from the controller to the safety switching device by the transmission device;

wherein a safety-relevant error is detected in the safety circuit by having the safety switching device evaluate the control signals EFC 1 and EFC 2, and wherein each of the drive systems can be controlled to cause associated ones of the rotor blades to travel to a safe position when the safety-relevant error is present;

wherein the safety switching device enables at least two test signals to be generated;

wherein the transmission device enables the test signals to be transmitted from the safety switching device to the controller; and wherein the controller enables the test signals to be used to form the control signals EFC 1 and EFC 2.

2. The safety system of claim 1, wherein the control signals EFC 1 and EFC 2 from the controller are generated in a redundant manner.

3. The safety system of claim 1, wherein the safety switching device is used to enable the control signals EFC 1 and EFC 2 to undergo a plausibility check, and wherein the presence of a safety-relevant error in the safety circuit is detected from the result of the plausibility check.

4. The safety system of claim 3 wherein:
the transmission device is configured to transmit at least one other signal to the safety switching device; and
wherein the safety switching device is used to enable the control signals EFC 1 and EFC 2, together with the at least one other signal, to undergo the plausibility check.

5. The safety system of claim 1, wherein the safety switching device comprises a short-circuit and cross-circuit detection.

6. The safety system of claim 1, wherein the safety switching device enables the control signals EFC 1 and EFC 2 to be compared with one another and the presence of a safety-relevant error in the safety circuit to be detected from a result of the comparison.

7. The safety system according to claim 1, wherein the control signals EFC 1 and EFC 2, during operation as intended of the wind turbine, have a specified first signal level, and wherein the control signals EFC 1 and EFC 2 are able to be switched off by the controller when carrying out a travel of the rotor blades to the safe position.

8. The safety system according to claim 1, wherein the safety switching device enables signal levels of the control signals EFC 1 and EFC 2 to be compared with one another, and the presence of a safety-relevant error in the safety circuit to be detected by identifying that the control signals have a different signal level for a specified time span.

9. The safety system of claim 1, wherein by using the controller, at least two switches can be switched, and wherein one of the test signals is applied to an input side of each of the at least two switches, and wherein the control signals EFC 1 and EFC 2 are formed by the output signals from the at least two switches.

10. The safety system of claim 9, wherein the switches, during operation as intended of the wind turbine, are closed, and wherein the switches are opened by the controller for carrying out a travel of the rotor blades to the safe position.

11. The safety system of claim 1, wherein the controller is supplied with at least one input signal which is evaluated by controller, and wherein the control signals EFC 1 and EFC 2 are generated as a function of the at least one input signal.

12. The safety system of claim 11, further comprising a sensor device connected to the controller, the sensor device comprising at least one sensor configured to generate at least one sensor signal; and wherein the input signal is generated as a function of the at least one sensor signal, and the at least one sensor signal is a function of at least one operating parameter of the wind turbine.

13. The safety system of claim 12, wherein the sensor is provided in a redundant manner so that the input signal of the controller can be supplied redundantly in the form of at least two input signals.

14. The safety system of claim 1, wherein the transmission device comprises a plurality of slip rings which carry the control signals EFC 1 and EFC 2.

15. A method for implementing a safety system for a wind turbine, wherein the wind turbine includes a rotor having a plurality of rotor blades, the method comprising:
using a pitch system including:
a plurality of drive systems operably associated with each of the rotor blades, and
at least one safety switching device, the safety switching device configured to enable each of the drive systems to be controlled, using at least one control signal, to carry out a travel of its associated said rotor blade to a safe position;
using a safety circuit provided in a machine part adjacent to the pitch system, the safety circuit including a transmission device and a controller, the controller generating the at least one control signal which is transmitted from the controller to the safety switching device by the transmission device;
the control signal further being output by the controller in the form of at least two control signals EFC 1 and EFC 2;
the control signals EFC 1 and EFC 2 being transmitted from the controller to the safety switching device by the transmission device;
detecting a safety-relevant error using the safety circuit by having the safety switching device evaluate the control signals EFC 1 and EFC 2; and
using each of the drive systems to cause associated ones of the rotor blades to travel to a safe position when the safety-relevant error is present;
wherein using the safety switching device includes enabling the safety switching device to generate at least two test signals;
wherein the transmission device enables the test signals to be transmitted from the safety switching device to the controller; and
wherein the controller enables the test signals to be used to form the control signals EFC 1 and EFC 2.

16. A safety system for a wind turbine, wherein the wind turbine includes a rotor having a plurality of rotor blades, the safety system comprising:
a pitch system including:
a plurality of drive systems operably associated with each of the rotor blades, and
at least one safety switching device, the safety switching device configured to enable each of the drive systems to be controlled, using at least one control signal, to carry out a travel of its associated said rotor blade to a safe position;
a safety circuit provided in a machine part adjacent to the pitch system, the safety circuit including a transmission device and a controller, the controller generating the at least one control signal which is transmitted from the controller to the safety switching device by the transmission device;

the control signal further being output by the controller in the form of at least two control signals EFC 1 and EFC 2;

the control signals EFC 1 and EFC 2 being transmitted from the controller to the safety switching device by the transmission device;

wherein a safety-relevant error is detected in the safety circuit by having the safety switching device evaluate the control signals EFC 1 and EFC 2, and wherein each of the drive systems can be controlled to cause associated ones of the rotor blades to travel to a safe position when the safety-relevant error is present; and wherein the safety switching device enables the control signals EFC 1 and EFC 2 to be compared with one another and the presence of a safety-relevant error in the safety circuit to be detected from a result of the comparison.

\* \* \* \* \*